April 19, 1932.  C. H. TEESDALE  1,854,316
CONTROLLING MEANS FOR ELECTRIC SWITCHES
Filed July 30, 1927   3 Sheets-Sheet 2
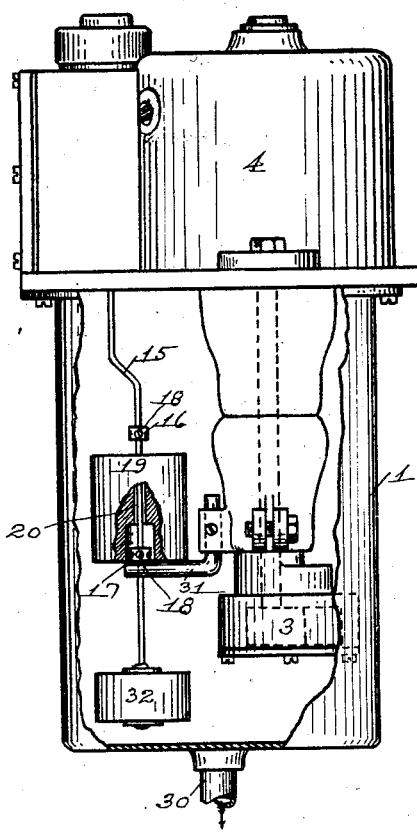
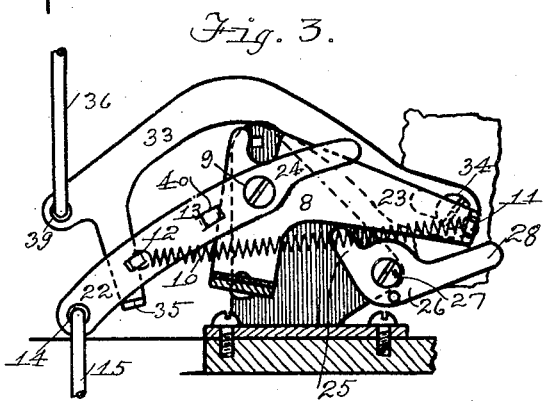
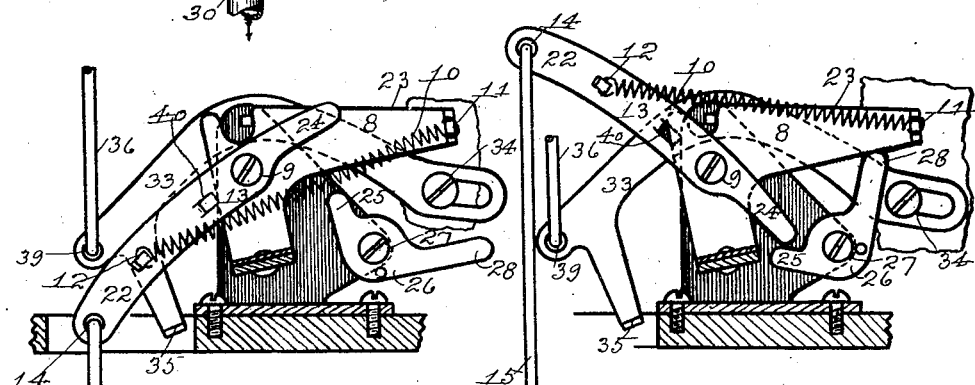
INVENTOR
Clyde H. Teesdale
BY
Cyrus W. Rice
ATTORNEY April 19, 1932. C. H. TEESDALE 1,854,316
CONTROLLING MEANS FOR ELECTRIC SWITCHES
Filed July 30, 1927 3 Sheets-Sheet 3
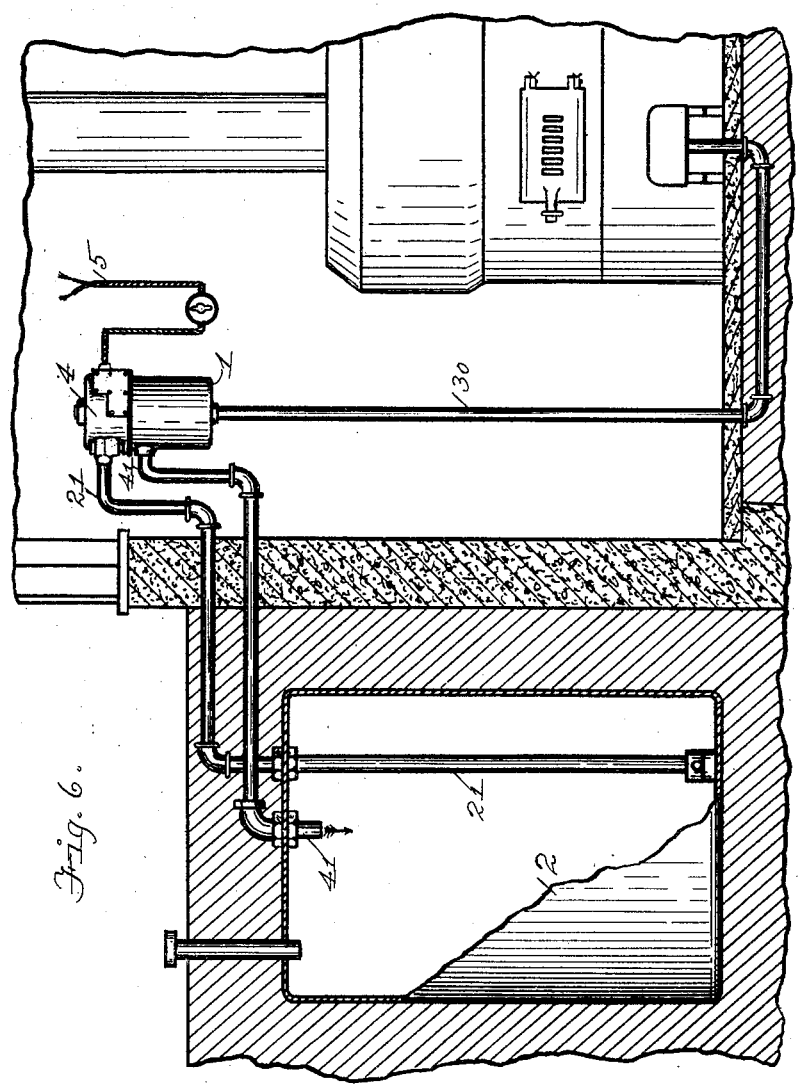
INVENTOR
Clyde H. Teesdale
BY
Cyrus M. Rice
ATTORNEY Patented Apr. 19, 1932

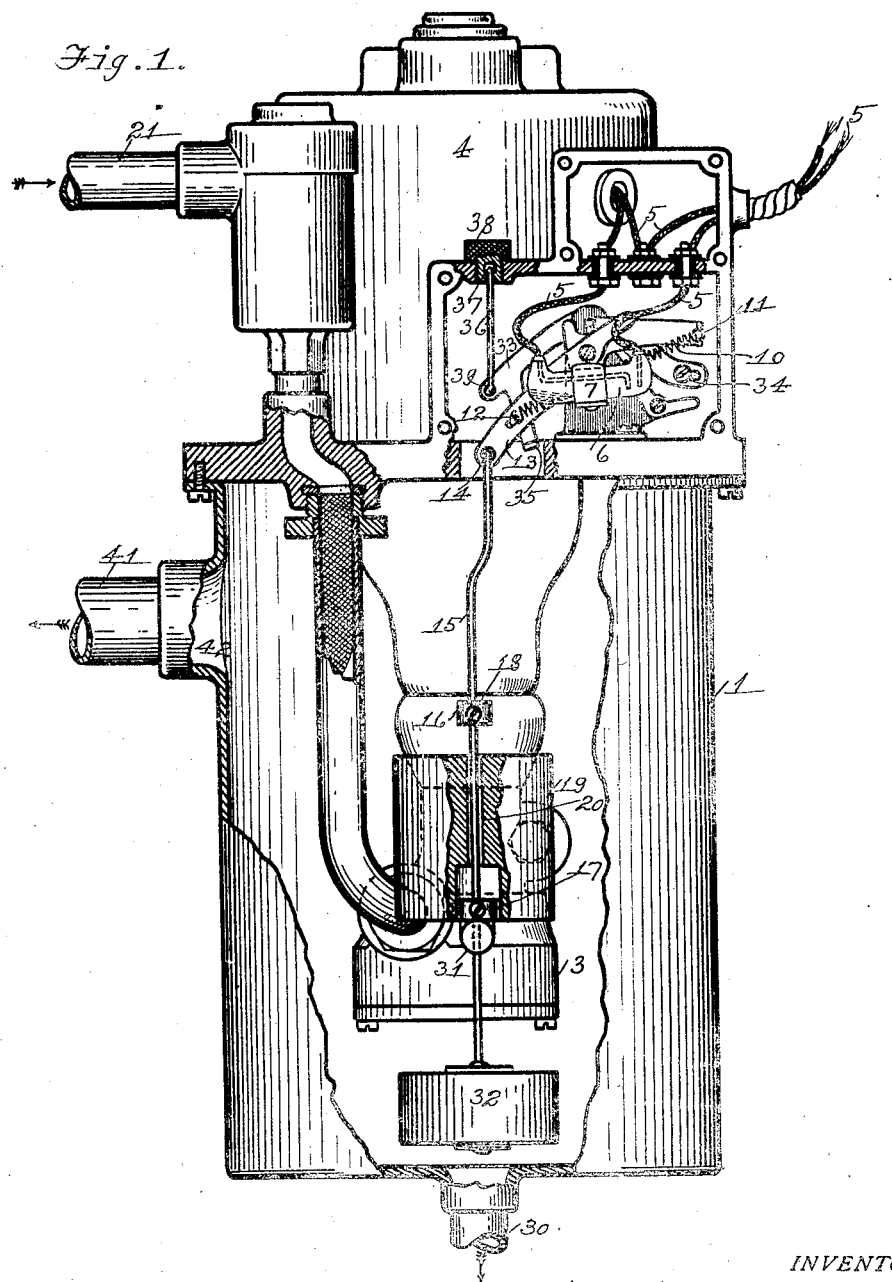

1,854,316

UNITED STATES PATENT OFFICE

CLYDE H. TEESDALE, OF GRAND RAPIDS, MICHIGAN, ASSIGNOR TO TEESDALE MANU-
FACTURING COMPANY, OF GRAND RAPIDS, MICHIGAN, A CORPORATION OF MICHI-
GAN

CONTROLLING MEANS FOR ELECTRIC SWITCHES

Application filed July 30, 1927. Serial No. 209,419.

The present invention relates to controlling means for electric switches; and its object is, generally, to provide means of that character improved in certain respects hereinafter appearing; and more particularly, to provide an improved float-operated switch having in addition to its regular operation a safety-providing action.

These and any other objects hereinafter appearing are attained by, and the invention finds preferable embodiment in, the organization hereinafter particularly described in the body of this specification and illustrated by the accompanying drawings, in which:—

Figure 1 is a side view of a vessel adapted to contain liquid (as oil used in oil-burning heaters), having liquid-supplying means, an electric switch for governing the operation of said means, and controlling means for the switch, certain parts being broken away;

Figure 2 is a side view thereof looking toward the right-hand side of Figure 1, certain parts being broken away;

Figure 3 is a side view of the parts carrying said switch, shown in switch-closing position;

Figure 4 is a side view thereof shown in a switch-opening position;

Figure 5 is a side view of the same shown in another switch-opening position;

Figure 6 is a side view of parts seen in Figure 1, and a vertical sectional view of the reservoir from which the liquid is supplied.

In the embodiment of the invention illustrated by the accompanying drawings, an oil-containing vessel 1 of an oil-burning heating installation is shown, supplied from a suitable source as the reservoir 2 (shown in Figure 6) by electrically-operated means, as a pump driven by an electric motor, said pump and motor being of usual construction, and contained in a suitable casing 3 and housing 4 respectively. The electric circuit 5 containing said motor and a source of electric energy (not shown) has a circuit closer and opener or "switch" of any suitable type, preferably the mercury switch 6 as shown. This switch is carried, as by an embracing band 7, on a member 8 tiltable about a horizontal axis 9 into circuit-opening position seen in Figures 1, 4 and 5, and into circuit closing position shown in Figure 3. A spring 10 connected at 11 to the switch carrying member 8 and at 12 to a lever 13 having a swinging movement about said axis 9 extends, during the closed position of the switch and the regular pumping operation of the motor, below said axis 9 as seen in Figure 3 and thus yieldingly maintains the lever 13 and the switch and its carrying member 8 in the interrelative positions seen in Figure 3 wherein the circuit is closed. To the free end of this lever 13 is connected at 14 a depending rod 15 extending into the vessel 1. This rod carries spaced stops or collars 16, 17 preferably adjustably held on the rod by small set screws 18. A float 19 floats on the oil in the vessel, having a movement between these stops, the rod 15 extending loosely through a vertical opening 20 in said float.

In regular operation, the running motor pumps the oil from the reservoir 2 into the vessel 1 through a pipe 21 leading to the pump, which causes the float 19 to rise. When said float has risen to the level predetermined by the adjusted position of the upper stop collar 16, it engages this collar and swings the arm 22 of lever 13 upwardly, and by reason of the spring 10 thus passing above the axis 9, suddenly raises the arm 23 of the switch-carrying member 8 and moves the switch to circuit-opening position, the parts being now in the position shown in Figure 5, wherein the short arm 24 of lever 13 in its said movement has engaged the short arm 25 of a bell crank lever 26 fulcrumed at 27 and has thus swung this bell crank lever's long arm 28 upwardly under the arm 23 of the switch-carrying member 8 to hold said arm 23 up, additionally to the action of spring 10 in its position seen in Figure 5.

The oil in the vessel 1 having thus reached the predetermined high level, the pump's operation ceases by opening the switch by the operation of the means described. When the oil, passing out of the vessel 1 through its discharge pipe 30 leading to the oil-burning heater, reaches a lower level predetermined by the position of the lower stop collar 17, said float 19 falling engages this lower collar and swings arm 22 of lever 13 downwardly so that its short arm 24 disengages the short arm 25 of bell crank lever 26, whereupon said bell crank lever turns by gravity to the position seen in Figure 3 thus releasing its long arm 28 from its supporting engagement with arm 23 of the switch-carrying member 8. The said movement of lever 13 continuing, the spring 10 passes below the axis 9 and suddenly swings the switch-carrying member 8 to the position seen in Figure 3 and closes the switch so that the motor resumes operation to pump oil into the vessel.

The float 19 rests in its lowest position on a vertically-adjustable stop 31. A second float 32 below the main float 19 is attached to the rod 15, and a lever 33 swingably mounted at 34 is provided having means, as the ledge 35, for engaging the arm 22 of lever 13 to raise the same from its lowest position seen in Figure 4. Means, as the link 36 connected at 37 to the screw plug 38 and at 39 to lever 33 for raising it to cause its said ledge to engage and raise arm 22 of lever 13 is also provided.

If for any cause the oil is exhausted from vessel 1 or has fallen to a level too low to support the main float 19, the plug 38 may be unscrewed and raised, thereby raising by link 36 the levers 33 and 13 to swing the switch to circuit-closing position. The plug being held raised long enough, sufficient oil is pumped into the vessel 1 to raise the main float 19 and thus maintain the circuit closed and the motor running, whereupon the plug may be released and screwed into the position seen in Figure 1.

It will be seen that the arm 23 of the switch-carrying member 8 is swung upwardly from its position seen in Figure 3 to its position shown in Figure 4 to open the circuit, although in such movement the spring 10 may not pass above the axis 9. This action is effected by the lug 40 of lever 13 in the downward movement of its arm 22 engaging and swinging the switch-carrying member 8 as seen in Figure 4. The special function of this spring 10 is to cause the sudden turning of the switch-carrying member 8 when said spring passes above or below the axis 9; and, excepting for effecting such quick action of the switch, said spring may be dispensed with, for the arm 23 of member 8 being heavier than the portion of said member on the opposite side of the axis 9, will tend to fall, but may be raised by the arm 24 of lever 13 striking in its downward movement the arm 25 of bell crank lever 26 thus causing its opposite arm 28 to rise and slidably engage the under surface of arm 23 of member 8 and thus raise and hold the same in the position seen in Figure 5 opening the circuit; and when the arm 24 of lever 13 is swung upwardly, the arm 23 of member 8 will fall by moving the arm 28 of the bell crank lever out of its supporting engagement therewith, said arm 28 in its supporting position being inclined (as seen in Figure 5) from right-angled relation with arm 23 of member 8. When the oil in vessel 1 reaches the level of the inlet 42 into pipe 41, it overflows therethrough into the reservoir 2.

Furthermore it will be seen that the main float 19 by its upward movement opens the switch, and by its downward movement closes the same, and that, when such downward movement has continued far enough to engage the lug 40 with the switch-carrying member 8, it again opens the switch, the device thus operating to effect said ends effected by the action of my controlling means for electric switches which forms the subject of my pending application Ser. No. 83,327, filed January 23, 1926.

The invention being intended to be pointed out in the claims, is not to be limited to or by details of construction or arrangement of the particular embodiment thereof illustrated by the drawings or hereinbefore described.

I claim:

1. In a device of the character described: an electric switch swingable to open and to closed positions; a swingable element; a bell-crank lever having an arm engaged by said element in its movement in one direction to turn the other arm of the lever into holding engagement with the switch in one of its positions, said first-mentioned arm being releasable from engagement with said element by said element's movement in its other direction to release the switch from such holding engagement.

2. In an organization of the character described: a vessel adapted to contain liquid; a float therein; an electric switch; connections between the float and the switch for opening the switch by the movement of the float in one direction, and for closing the switch by the movement of the float in the opposite direction, and for opening the switch by the movement of the float continued in the last-mentioned direction; a second float in the vessel having a movement within limits lower than the movement of the first-mentioned float, for operating the switch by means of said connections.

3. In an organization of the character described: a vessel adapted to contain liquid; an electric switch; a rod connected therewith having spaced stops; a float in the vessel having a downwardly-limited movement between the stops and adapted to engage in its movement in one direction one of the stops to move the switch to one of its positions, and in the float's movement in the opposite direction to engage the other stop to move the switch to its opposite position, and in the float's continued movement in its last-mentioned direction to move the switch to its first-mentioned position; a second float in the vessel connected to the rod, below the first-mentioned float, for operating the switch.

4. In an organization of the character described: a vessel adapted to contain liquid; a float therein; a pivotally mounted member carrying an electric switch turnable therewith to open and to closed positions; a pivotally mounted arm; a rod connecting the float and the arm to swing the arm by the movement of the float; a contractile spring connected to the arm and said member, the rising movement of the float and the arm carrying the spring above the pivotal mounting of said member to yieldingly swing the switch to open position, and the first portion of the falling movement of the float and arm carrying the spring below said mounting to yieldingly swing the switch to closed position, the arm engaging said member to positively swing the switch to open position in the continued falling movement of the float and arm.

5. In an organization of the character described: a vessel adapted to contain liquid; an electric circuit; a switch therein movable to positions opening and closing the circuit respectively: a float in the vessel connected with the switch for moving the same to one of its positions by the movement of the float in one direction, and for moving the switch to its other position by the movement of the float in the opposite direction, and for moving the switch to its first-mentioned position by the movement of the float continued in its last-mentioned direction: a second float in the vessel having a limited floating movement lower than that of the first-mentioned float, and connected with the switch for moving the same to one of its positions.

6. In a machine of the character described: an electric circuit for operating the same, containing a switch; a main float in the vessel connected with the switch for controlling the regularly-running operation of the machine and opening the switch by the rising movement of the float, and closing the switch by the falling movement of the float, and again opening the switch by the continued falling movement of the float; an emergency float in the vessel having a limited floating movement lower than that of the main float, and connected with the switch for opening the same.

7. In a machine of the character described: an electric circuit for operating the same, containing circuit-opening and closing means; a main float having a limited floating movement in the vessel and connected with the circuit-opening and closing means for controlling the regular-running operation of the machine by the rising and falling movements of the float; an emergency float in the vessel having a floating movement within a limit different from that of the main float, and connected with circuit-opening and closing means.

8. In a machine of the character described: an electric circuit for operating the same, containing circuit opening and closing means; a float in the vessel connected with said means for controlling the regularly-running operation of the machine and opening the circuit by the rising movement of the float and closing the circuit by the falling movement of the float; a second float in the vessel having a limited floating movement lower than that of the first-mentioned float and connected with such means for opening the circuit by the falling movement of the second-mentioned float.

In testimony whereof I have hereunto set my hand at Grand Rapids, Michigan, this 14th day of July, 1927.

CLYDE H. TEESDALE.